United States Patent [19]

Fritchman

[11] Patent Number: 4,632,644

[45] Date of Patent: Dec. 30, 1986

[54] REFRIGERATION COMPRESSOR

[75] Inventor: Jack F. Fritchman, Cullman, Ala.

[73] Assignee: White Consolidated, Inc., Cleveland, Ohio

[21] Appl. No.: 632,707

[22] Filed: Jul. 20, 1984

[51] Int. Cl.$^4$ .......................... F04B 35/04; H02K 5/00
[52] U.S. Cl. .................................... 417/415; 417/902; 310/91
[58] Field of Search ............... 417/415, 365, 410, 372, 417/360, 902; 310/91, 90

[56] References Cited

U.S. PATENT DOCUMENTS

| | | | |
|---|---|---|---|
| 1,610,726 | 12/1926 | Arutunoff | 310/90 |
| 1,665,097 | 4/1928 | Huguenin | 417/410 |
| 2,648,790 | 8/1953 | Harmon | 310/90 |
| 2,738,122 | 3/1956 | Gardiner | 417/360 |
| 3,253,776 | 5/1966 | Parker | 417/372 |
| 3,369,136 | 2/1968 | Sanger | 310/90 |
| 4,069,435 | 1/1978 | Wannerskog et al. | 310/90 |

FOREIGN PATENT DOCUMENTS 5131250  11/1980  Japan ...................................... 310/90

*Primary Examiner*—Cornelius J. Husar
*Assistant Examiner*—Peter M. Cuomo
*Attorney, Agent, or Firm*—Pearne, Gordon, Sessions, McCoy, Granger & Tilberry

[57] ABSTRACT

A small, single cylinder, hermetic refrigeration compressor of the fractional horsepower type has a cylinder block with a piston and cylinder at the lower end. Above the cylinder block is mounted the motor stator. A bearing hub is centrally mounted on the cylinder block, and provides a single radial bearing for the crankshaft, which extends upward through the bearing hub and has the rotor mounted on the upper end. The crankshaft is journaled directly in the bearing hub, while the thrust is taken up by a small ball bearing mounted between the rotor and an end face on the bearing hub. The thrust bearing uses a pair of flat thrust washers as races, while the balls, which are widely spaced and minimum in number, are mounted in a plastic cage.

7 Claims, 4 Drawing Figures

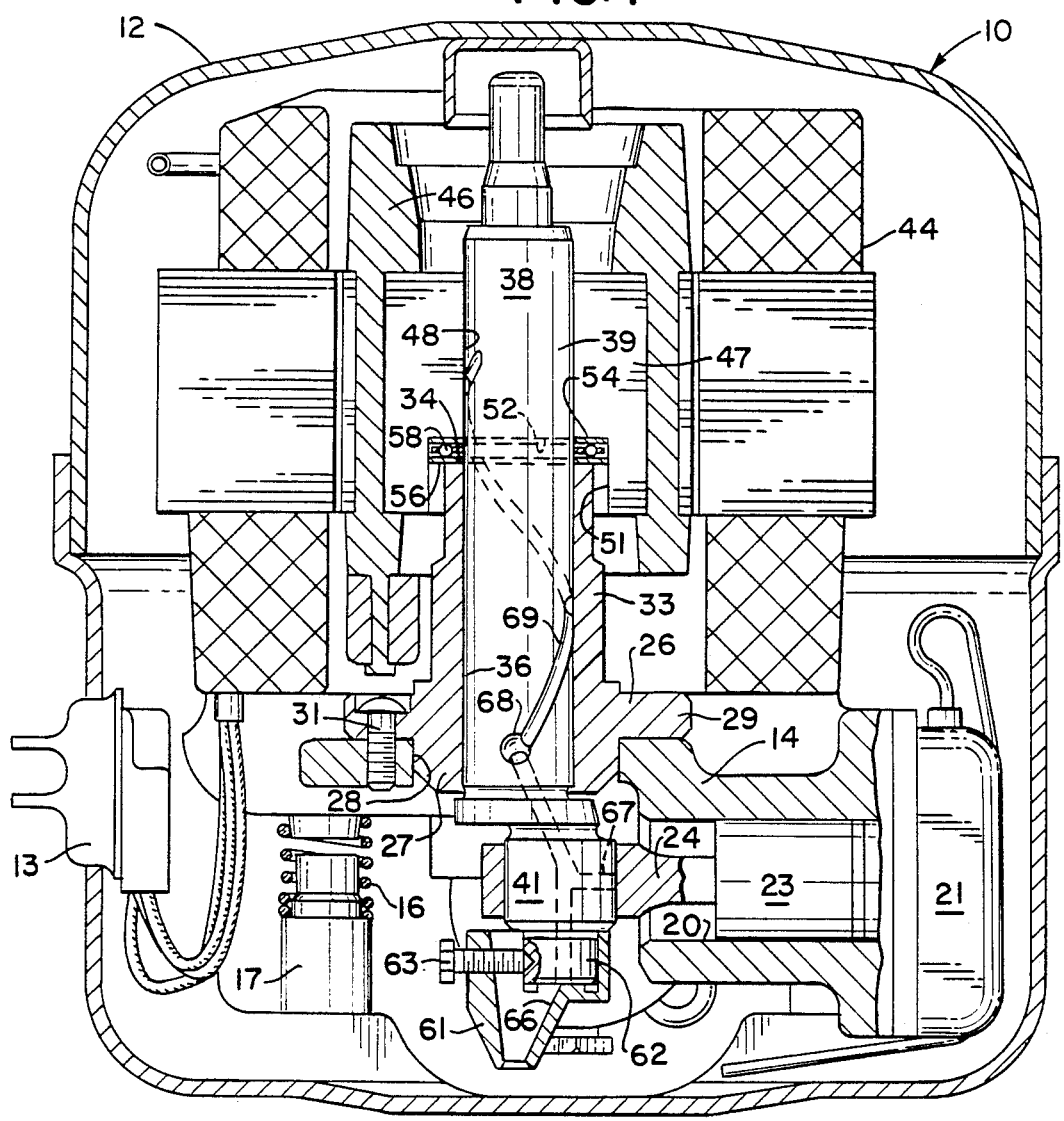

REFRIGERATION COMPRESSOR

BACKGROUND OF THE INVENTION

This invention relates generally to refrigeration compressors, and more particularly to small hermetic refrigeration compressors used in household appliances such as refrigerators and food freezers.

Because of high energy costs and various governmental requirements, household appliances are being extensively redesigned to increase their energy efficiency. In the case of refrigerators and food freezers, substantial improvements have been made by using superior insulation and by various other improvements in the refrigeration system itself, including the sizing of evaporators and condensers. One of the areas that has received the most attention is to increase the efficiency of the refrigeration compressor itself. This efficiency is expressed as the energy efficiency ratio (EER), which is measured by dividing the BTU/hr. output by the wattage power consumption under standard running conditions, and the resulting ratio is the energy efficiency ratio where the higher the number, the greater the efficiency. At one time, certain refrigeration compressors may have had an energy efficiency ratio as low as 2 to 2.5, but current developments have increased this above 4, and some compressors have been known to approach the ratio of 5 or better.

Increases in compressor efficiency have come primarily from increases in the electrical efficiency of the motor and from increases in the volumetric efficiency of the pump. One area that has received little attention is the area of mechanical friction, because it has not been recognized that any suitable means could be used to decrease the bearing friction of the principal rotating part, namely, the crankshaft. The crankshaft on these compressors generally rotates about the vertical axis, and therefore requires journaling in radial bearings to position and confine its rotation about the axis and using a thrust bearing to take the weight of the crankshaft and the parts mounted thereon. These bearings have generally been of the plain or oil film type, using a hardened steel crankshaft running in machined bearing surfaces on a cast iron frame, and the thrust bearing has commonly been in the form of hardened flat washers which may either float or be non-rotatably secured to the crankshaft or other parts. Such fluid film bearings have offered quiet operation and long life, while providing an acceptable level of friction, and therefore efforts to utilize rolling element bearings have generally not been successful, not only because of the higher cost, but also because of increased noise and shortened life of operation of such bearings.

It is recognized that in larger size compressors, such as multiple piston types used for central air conditioning units, ball and roller type bearings have been used with considerable success, and in fact have become almost necessary because of some of the high bearing loads in such units. Such units have positive displacement oil pumps and oil circulation under pressure to provide adequate lubrication for the rolling element bearings, and generally the locations where such units are used do not make extremely quiet operation a necessity. However, efforts to utilize such rolling element bearings on small household-type compressors run into a scale factor problem, where on the much smaller units there is insufficient space for many rolling element bearings, and they represent a substantial increase in cost over the plain fluid film bearing. Furthermore, the application in household refrigerators requires an extremely low noise level to be acceptable, and such compressors are required to have a long life of 10 or more years, often operating under a better than 50% duty cycle. Furthermore, such household compressors, which normally operate using two-pole motors of a nominal speed of 3600 rpm, utilize radially extending surfaces and centrifugal force to produce the necessary oil circulation for lubrication, and such lubrication is not as readily controllable, nor as predictable, as the lubrication provided by a positive displacement pump such as is used in larger compressors.

SUMMARY OF THE INVENTION

According to the present invention, it has been found that friction can be definitely and notably reduced without any substantial rise in cost or changes in construction by the use of a rolling element bearing at only one location in the compressor, and that is for the crankshaft thrust bearing.

In the compressor on which the present invention has been installed, a pair of hardened steel thrust washers as the thrust bearing were previously used, and these washers were located around the crankshaft between the rotor member on the upper side and a bearing hub on the lower side that also provided the radial bearing for the crankshaft in addition to the thrust bearing on the top side of the hub. According to the preferred embodiment of the present invention, the space between the surfaces on the hub and the rotor is slightly increased and made to receive on each side a plain hardened thrust washer or race that is free to rotate relative to all of the other structures. Between the two hardened washers s a ball bearing having a minimum number of balls carried in a plastic cage, arranged to hold the balls in positive spacing equidistantly around the crankshaft. The balls can be quite small in size, since the actual bearing loads are quite low, and are kept to a minimum in number, preferably six, so as to space the loads around the periphery yet provide a minimum of friction between the balls and the cage holding them. The cage can be formed from a suitable plastic material, such as nylon, by molding in such a configuration that the balls can be easily snapped in place with a minimum of force, and yet will be retained therein during assembly of the compressor.

Friction has been further minimized by having the contact between the balls and the races a true point contact, which still provides sufficient bearing capacity because of the low thrust loading on the bearing. Furthermore, the balls make a relatively loose fit with the plastic cage to further minimize the friction at this point. Lubrication is provided in the conventional manner by a conical scoop in the bottom of the crankshaft acting as a centrifugal pump to force the oil upwards through internal passages in the crankshaft and into a spiral groove on the exterior surface which extends upward to a point above the thrust bearing to ensure an adequate oil flow directly to the thrust bearing.

In testing this construction on a number of different compressors of varying displacement and different motor horsepower, in each case there is found to be a noticeable improvement in the energy efficiency ratio in that in each case, with all other factors being constant, there is an increase between 0.3% and 1.5% in the BTU/hr. output and a reduction of up to 3% in the wattage consumed to operate the compressor, with the result that the overall energy efficiency ratio has been increased by a factor ranging between 2% and 4% above the energy efficiency ratio for the same compressor with a plain fluid film thrust bearing.

BRIEF DESCRIPTION OF THE DRAWINGS

FIG. 1 is an elevational, cross-sectional view of a small single cylinder, hermetic compressor incorporating the thrust bearing of the present invention;

FIG. 2 is a plan view of one of the hardened thrust washers used in the bearing;

FIG. 3 is a plan view of the ball bearing cage; and

FIG. 4 is an enlarged, cross-sectional view through the ball bearing cage, showing the fit of a bearing ball therein.

DESCRIPTION OF THE PREFERRED EMBODIMENT

Referring to the drawings in greater detail, FIG. 1 shows a compressor 10 incorporating the ball thrust bearing according to the preferred embodiment of the invention. The compressor 10 includes the usual shell 12 which hermetically seals the interior of the compressor and whose surface is unbroken except for the inlet and outlet lines and the electrical connector indicated at 13. Within the shell 12 is mounted a cylinder block 14 which is resiliently suspended within the shell 12 by suitable spring mounts such as those using a helical compression spring 16 connected to the cylinder block 14 and mounted over an upwardly projecting post 17 secured to the inner side of the shell. Although only one such mount is shown, it will be understood that three or four of these mounts are provided at the desired spacing to support the cylinder block and the remainder of the mechanism within the shell.

The cylinder block 14 includes a horizontally extending cylinder bore 20 which is closed off at the outer end adjacent to the shell 12 by a cylinder head 21 containing the suction and discharge valves and associated plenums and passages. A piston 23 is fitted within the cylinder bore 20 and is reciprocated in the cylinder bore 20 by a connecting rod 24.

Extending upward from the center of the cylinder block 14 is a bearing hub 26 which is positively located with respect to the cylinder block 14 by a lower pilot portion 27 which fits within a receiving bore 28 formed on the cylinder block 14 and is positioned vertically by a radial flange 29 which engages a corresponding surface n the upper side of the cylinder block 14. The bearing hub 26 is securely held in place by suitable fastening means, such as screws 31, but may also be attached by rivets or other suitable means so that it may be precisely and permanently attached to the cylinder block 14 in proper alignment with respect to the cylinder bore 20. The bearing hub 26 has a sleeve portion 33 extending upwardly to terminate in a radial end face 34 a spaced distance above the flange 29. The bearing hub 26 includes an axial bore 36 extending vertically therethrough which serves to journal the crankshaft 38, which has a cylindrical outer surface 39 along a major portion of its length which makes bearing contact with the bore 36. At its lower end, crankshaft 38 carries a crank journal 41 eccentric from the cylindrical surface 39 which fits within the end of the connecting rod 24 to reciprocate the piston 23 in bore 20.

The compressor is driven by a suitable electric motor which is usually a two-pole, single-phase induction motor of the squirrel-cage type, and which includes a stator 44 securely mounted on the upper side of the cylinder block 14 concentric with the bore 36 and bearing hub 26. A rotor 46 is mounted concentrically within the stator 44 and secured to the crankshaft 38. Preferably, the rotor 46 has a plurality of laminations 47 which define an axial bore 48 which is a press-fit on the crankshaft cylindrical surface 39, so that after the rotor 46 is pressed in place on the crankshaft 38, the crankshaft and rotor form a single unitary assembly.

At the lower end of the rotor, a counterbore 51 is formed within the laminations 47 extending downwardly from the bore 48 to which it is joined by a radial face 52. The counterbore 51 is of such a length that laminations 47 extend downwardly around the upper end of the sleeve portion 33 of bearing hub 26. The thrust bearing assembly of the present invention is mounted within the counterbore 51 and comprises an upper washer or race member 54 abutting on its upper side the end face 52 and a lower washer 56 similar to washer 54 which rests on the upper end face 34 of the sleeve portion 33. A ball bearing assembly 58 is positioned between the upper and lower washers 54 and 56 so that the bearing assembly 58 rotatably supports the weight of the rotor 46 and crankshaft 38 and related rotating parts directly on the end of the bearing hub 26.

In order to provide lubrication of the compressor, a centrifugal oil pump 61 is secured to the stub portion 62 on the lower end of crankshaft 38 and secured in place by a suitable screw 63. The oil pump 61 rotates about the axis of rotation of the crankshaft 38 and has a sloping, pumping surface 66 extending radially outwardly and upwardly from the axis of rotation to an internal oil passage 67 formed within the crankshaft 38. As the crankshaft 38 and oil pump 61 rotate at high speed, the oil pump 61, which is submerged in the lubricating oil in the bottom of the compressor shell, causes the oil to be forced upwardly along the surface 66 by centrifugal force and then upwardly within the oil passage 67. The passage 67 has an outlet 68 on the cylindrical surface 39 of the crankshaft where it joins a spiral groove 69 extending around the cylindrical surface 39 upwardly to a point above the counterbore 51 so that oil is forced from the passage 67 along the spiral groove 69 to provide a continuing oil supply to the bearing assembly 58, as well as to the vertical bearing bore 36.

The construction of the bearing assembly 58 and the washers 54 and 56 is shown in greater detail in FIGS. 2–4. These washers 54 and 56 are identical, and are formed from a hardened spring steel. They have annular surfaces 72 on both sides that are finished to a high degree of smoothness and the washer has sufficient thickness that it will not distort under load. The outer diameter 73 is selected to have adequate clearance within the counterbore 51 so as not to make engagement therewith while the inner diameter 74 is selected to have a close clearance fit about the crankshaft surface 39 so that the washers will remain coaxial with the axis of the crankshaft.

The bearing assembly 58 positioned between the two washers 54 and 56 is shown in FIGS. 3 and 4, and includes a cage 76 formed of a suitable plastic material such as nylon or the like and generally has a thickness between the radial surfaces 79 such as to be adequate to retain the balls therein while ensuring that it does not rub against the adjoining surfaces of either of the washers 54 and 56. The cage 76 has an outside diameter 77 substantially the same as the outside diameter 73 of the washers, and likewise the cage 76 has an inside diameter 78 substantially the same as the inside diameter 74 of the annular washers. By thus maintaining a minimum clearance fit about the crankshaft's cylindrical surface 39, the cage 76 remains concentric with the crankshaft at all times.

The bearing assembly 58 includes a minimum number of small bearing balls 82 which are located in pockets 81 spaced equidistantly around the cage 76. The pockets 81 include a centrally positioned spherical portion 84 offering adequate clearance for the balls to rotate freely therein while minimizing any rubbing friction between the balls and the cage. On each side of the spherical portion 84 are located cylindrical portions 85, one of which may have a chamfer as indicated at 87, to facilitate insertion of the balls into the pockets 81. These cylindrical portions 85 are chosen to have a smaller diameter than the diameter of the balls 82 to provide positive retention of the balls under normal operating conditions.

The balls 82 are relatively small in size and are of a minimum number, such as five or six, to provide uniform loading around the periphery of the bearing at all times, but are not so great in number as to excessively increase the rolling friction, including the frictional content between the balls and the cage. Since the races on each side against which the balls roll are in the form of flat surfaces, there is true point contact rather than line contact between the balls and the washers 56 and 54, further minimizing friction. While the bearing runs at relatively high speed, it is relatively lightly loaded, since it is required only to support the weight of the crankshaft and rotor.

In a typical compressor to which this invention has been applied, as shown in FIG. 1, the crankshaft cylindrical surface 39 has a diameter of 0.751 inch, while the thrust washers 54 and 56 have a thickness of 0.031 inch with an inside diameter of 0.757 inch and an outside diameter of 1.08 inches. The balls 82 have a diameter of 3/32 or 0.09375 inch. The cage 76 has a thickness of 0.062 inch and the same inside and outside diameters as the washers 56 and 54. The ball pockets are spaced equidistantly around the cage on a centerline diameter of 0.919 inch, so that the balls occupy less than 20% of the spacing. That is, because of the diameter and location of the balls, which are six in number, a full complement of balls in abutting contact would be 30 balls of the same diameter.

In the prior design of the compressor shown in FIG. 1 before the application of the invention, the thrust bearing between the rotor and the bearing hub consisted of a hardened thrust washer which would be thinner than the washers 56 and 54 but provided with projecting ears fitting in grooves in the counterbore 51 so that the thrust washer could not rotate with respect to the rotor and the crankshaft. This hardened thrust washer then rode directly against the end face 34 of the bearing hub, which is made of suitable cast iron.

Comparative laboratory tests have been made on different compressors utilizing the plain thrust bearing described above with a spacer between the thrust washer and the rotor to maintain the rotor in the correct position. After the test was run with the plain bearing, the compressor was disassembled, the plain bearing removed, and the thrust bearing of the present invention installed. The compressor was then reassembled and run under the same conditions as with the plain bearing. The results of these tests are as follows.

TABLE 1

| | BTU/Hr. | Watts | EER |
|---|---|---|---|
| MLOE80 | | | |
| Std. Thrust Washer | 882 | 206 | 4.28 |
| Ball Thrust Bearing | 894 | 205 | 4.36 |
| Factor | 1.014 | .995 | 1.019 |
| MLOE105 | | | |
| Std. Thrust Washer | 1157 | 244 | 4.74 |
| Ball Thrust Bearing | 1160 | 238 | 4.87 |
| Factor | 1.003 | .975 | 1.027 |
| L208 (Ave. 5) | | | |
| Std. Thrust Washer | 861 | 208 | 4.14 |
| Ball Thrust Bearing | 866 | 202 | 4.29 |
| Factor | 1.006 | .971 | 1.036 |
| L208 (Ave. 4) | | | |
| Std. Thrust Washer | 845 | 208 | 4.07 |
| Ball Thrust Bearing | 851 | 203 | 4.19 |
| Factor | 1.007 | .976 | 1.029 |
| Average Factor | 1.008 | .979 | 1.028 |

The first test was done on a relatively small compressor of the type used in medium-sized refrigerators and, as can be seen, when the ball thrust bearing was substituted for the plain bearing, the BTU output increased while the wattage input decreased slightly, showing an increase in the overall energy efficiency ratio (EER) of almost 2%. The second test was performed on a slightly larger compressor, and while the BTU output increase was not as great, there was a greater drop in the wattage input for an overall greater increase in efficiency. The last two tests were done on different groups of five and four compressors, respectively, and the results listed are an average for the groups. In each case, the BTU output increased using the ball thrust bearing, while the wattage input decreased for an overall increase in the energy efficiency ratio of up to 3.6%.

As can be seen, the simple substitution of the ball thrust bearing for the plain bearing does produce an increase in efficiency even though the same fluid film bearings are used for the radial bearings for the crankshaft, and no other parts are replaced. The ball thrust bearing of this invention with the two hardened washers and the plastic cage with a minimum number of balls therein is of relatively lost cost construction and produces little increase in the overall cost of the compressor while providing a noticeable increase in efficiency.

Although the preferred embodiment of this invention has been shown and described, it should be understood that various modifications and rearrangements of the parts may be resorted to without departing from the scope of the invention as disclosed and claimed herein.

What is claimed is:

1. A hermetic refrigeration compressor comprising a shell, a cylinder block mounted in said shell, a single piston and cylinder means on said cylinder block, a stator mounted on said cylinder block, a bearing hub on said cylinder block defining a vertical bearing bore, said bearing hub having an end face at the top thereof around said vertical bore, a crankshaft journaled in said vertical bore and arranged to reciprocate said piston in said cylinder, said crankshaft having an upper end extending upwardly above said bearing hub, a rotor secured on said crankshaft upper end concentric with said stator, a thrust surface carried by said crankshaft above said end face, and a ball thrust bearing between said thrust surface and the end face on said bearing hub, said ball thrust bearing having a plastic cage loosely positioning a plurality of balls equidistantly and said balls rolling against flat washers on both sides of said cage, said balls occupying a space of less than twenty percent of a full complement of balls in abutting contact.

2. A hermetic refrigeration compressor as set forth in claim 1, wherein both of said flat washers are freely rotatable with respect to said crankshaft and said bearing hub.

3. A hermetic refrigeration compressor as set forth in claim 1, wherein said balls are six in number.

4. A hermetic refrigeration compressor comprising a shell, a cylinder block mounted in said shell, a single piston and cylinder means on said cylinder block, a stator mounted on said cylinder block above said piston and cylinder means, a bearing hub on said cylinder block extending upward from said piston and cylinder means within said stator and defining a vertical bearing bore, said bearing hub having an end face at the top end thereof, a crankshaft journaled in said vertical bore and arranged to reciprocate said piston in said cylinder, said crankshaft having an upper end extending upwardly above said bearing hub, a rotor having an axial bore secured on said crankshaft upper end concentric with said stator, said rotor having a counterbore receiving the top end of said bearing hub, and a ball thrust bearing in said counterbore engaging the end face of said bearing hub, said ball thrust bearing having a plurality of balls, the balls of said ball thrust bearing rolling on flat parallel surfaces, said balls being mounted and loosely retained in a plastic cage, said balls occupying a circular space of less than twenty percent of a full complement of balls in abutting contact.

5. A hermetic refrigeration compressor as set forth in claim 4, wherein said flat parallel surfaces are formed on hardened washer members.

6. A hermetic refrigeration compressor as set forth in claim 5, wherein said washers are free to rotate with respect to said hub and said rotor.

7. A hermetic refrigeration compressor as set forth in claim 4, wherein said balls are six in number.

* * * * *